United States Patent
Hyde

(10) Patent No.: US 8,862,462 B2
(45) Date of Patent: Oct. 14, 2014

(54) DYNAMIC METHOD FOR EMOTICON TRANSLATION

(75) Inventor: Stephen L. Hyde, Clarkston, MI (US)

(73) Assignee: Chrysler Group LLC, Auburn Hills, MI (US)

(*) Notice: Subject to any disclaimer, the term of this patent is extended or adjusted under 35 U.S.C. 154(b) by 290 days.

(21) Appl. No.: 13/315,995

(22) Filed: Dec. 9, 2011

(65) Prior Publication Data

US 2013/0151237 A1    Jun. 13, 2013

(51) Int. Cl.
*G06F 17/27* (2006.01)

(52) U.S. Cl.
USPC ............... 704/9; 345/589; 375/346; 382/154; 455/418; 455/466; 455/566; 701/1; 704/277; 704/3; 706/46; 709/204; 709/206; 715/762

(58) Field of Classification Search
CPC ..... H04L 12/581; H04L 67/306; H04L 51/04; H04L 12/58; H04L 12/14; H04L 12/1822; G10L 2013/00; G10L 13/043; G10L 17/26; G10L 2021/105
USPC ........... 345/589; 375/346; 382/154; 455/418; 455/466, 566; 701/1; 704/277, 3; 706/46; 709/204, 206; 715/762
See application file for complete search history.

(56) References Cited

U.S. PATENT DOCUMENTS

| | | | |
|---|---|---|---|
| 7,512,262 B2 * | 3/2009 | Criminisi et al. ............. | 382/154 |
| 8,473,441 B2 * | 6/2013 | Bill ................................ | 706/46 |
| 2002/0077135 A1 * | 6/2002 | Hyon ............................ | 455/466 |
| 2004/0018858 A1 * | 1/2004 | Nelson .......................... | 455/566 |
| 2004/0111272 A1 * | 6/2004 | Gao et al. ...................... | 704/277 |
| 2004/0148346 A1 * | 7/2004 | Weaver et al. ................ | 709/204 |
| 2005/0181777 A1 * | 8/2005 | Kim .............................. | 455/418 |
| 2005/0195927 A1 * | 9/2005 | Solonen ........................ | 375/346 |
| 2006/0009243 A1 * | 1/2006 | Dahan et al. .................. | 455/466 |
| 2007/0094330 A1 * | 4/2007 | Russell ......................... | 709/206 |
| 2007/0208569 A1 | 9/2007 | Subramanian et al. | |
| 2008/0059152 A1 | 3/2008 | Fridman et al. | |
| 2008/0163074 A1 | 7/2008 | Tu | |
| 2008/0269958 A1 * | 10/2008 | Filev et al. ...................... | 701/1 |
| 2009/0275321 A1 | 11/2009 | Crowe | |
| 2010/0088616 A1 * | 4/2010 | Park et al. .................... | 715/762 |
| 2010/0145694 A1 | 6/2010 | Ju et al. | |
| 2011/0238406 A1 * | 9/2011 | Chen et al. ........................ | 704/3 |
| 2011/0265018 A1 | 10/2011 | Borst et al. | |
| 2013/0120429 A1 * | 5/2013 | Sukup ........................... | 345/589 |

FOREIGN PATENT DOCUMENTS

KR    20070057606 A    6/2007

OTHER PUBLICATIONS

International Search Report dated Mar. 6, 2013 for International Application No. PCT/US2012/067592, International Filing Date Dec. 3, 2012.
Written Opinion dated Mar. 6, 2013 for International Application No. PCT/US2012/067592, International Filing Date Dec. 3, 2012.

* cited by examiner

*Primary Examiner* — Michael Colucci
(74) *Attorney, Agent, or Firm* — Ralph E Smith

(57) ABSTRACT

A vehicle communication system is provided and may include at least one communication device that audibly communicates information within the vehicle. A controller may receive a character string from an external device and may determine if the character string represents an emoticon. The controller may translate the character string into a face description if the character string represents an emoticon and may audibly communicate the face description via the at least one communication device.

19 Claims, 19 Drawing Sheets

Fig-8

| Characters | Face Description |
|---|---|
| <3 | love |
| <B | love |
| XD | laughing |
| xD | laughing |
| \mm/ | rock on |
| \MM/ | rock on |

Fig-11

| Character(s)/Attribute | | | | | | |
|---|---|---|---|---|---|---|
| Eyebrows A | | Hair | | Beard | Hat | |
| ( | @ | with curly hair | > | with beard | v | hat |
| L | & | with curly hair | | | d | cap |
| > | ? | | | | 0 | angel |
| ˙ | | | | | O | angel |
| Eyebrows B | | | | | | |
| ⌢ | | | | | | |
| ⌢ | | | | | | |

| Face Description | Base Eye Characters* | Enclosed By ( ) or [ ] or { } | Separated By | | | | | | | | |
|---|---|---|---|---|---|---|---|---|---|---|---|
| | | | space " " | period "." | under-score "_" | dash "-" | comma "," | colon ":" | semi-colon ";" | lower case "o" | lower case "v" |
| angry face | >< | yes | na | na | na | na | na | na | na | na | na |
| face | :: | yes | X | | | | X | | | X | |
| face | :: | no | | X | | | X | | | X | |
| annoyed face | :: | yes or no | | X | | | | | | | |
| bored face | :: | yes or no | | | X | | | | | | |
| face | ?? | yes | X | X | X | | X | | | X | X |
| face | ?? | no | | X | X | | X | | | X | X |
| wide eyed face | o o | yes | X | X | X | | | | | | |
| wide eyed face | o o | no | | X | X | | | | | | |
| wide eyed face | O O | yes | X | X | X | | | | | | |
| wide eyed face | O O | no | | X | X | | | | | | |
| wide eyed face | 0 0 | yes | X | X | X | | | | | | |
| wide eyed face | 0 0 | no | | | X | | | | | | |
| face | ·: | yes | X | X | X | X | X | X | X | X | X |
| face | :· | no | X | | X | X | | | | X | X |
| face | ·; | yes | X | X | X | X | X | X | X | X | X |
| face | ;· | no | X | | X | X | | | | X | X |
| face | ** | yes | X | X | X | X | X | X | X | X | X |
| face | ** | no | X | | X | X | X | | | X | X |
| angry face | ^^ | yes | X | X | X | X | X | | | X | |
| angry face | ^^ | no | | X | X | X | X | | | X | |
| looking left face | vv | yes | x | | X | | | | | | |
| looking right face | >> | yes | x | | X | | | | | | |
| face | << | yes | X | X | | | | | | X | X |
| dead face | xx | yes | X | X | X | | | | | | |

*Fig-9*

| Character(s)/Attribute |||||
|---|---|---|---|---|
| Eyes A || Mouth A || Nose A |
| :" | crying | * | kiss | /\ | big nose |
| :' | crying | x | sealed lips | - | |
| :', | crying | s | confused | o | |
| ;" | crying | S | confused | ^ | |
| ;' | crying | | | O | |
| ;, | crying | Mouth B || 0 | |
| =" | crying | #) | happy braces | v | |
| =' | crying | #( | sad braces | + | |
| =, | crying | ) | happy | = | |
| | | ( | sad | d | |
| Eyes B || ] | happy | @ | |
| : | | [ | sad | < | big nose |
| ; | winking | } | happy | > | big nose |
| = | | { | sad | | |
| 8 | with glasses | > | happy | Nose B ||
| | | < | sad | { | moustache |
| Eyes C || | | ~ | runny nose |
| (:) | with goggles | Mouth C || | |
| (;) | with goggles | # | braces | | |
| ' | winking | D | very happy | | |
| % | | i | straight | | |
| + | | 1 | straight | | |
| $ | money eyes | l | straight | | |
| ? | questioning eyes | B | bucktooth | | |
| # | | b | bucktooth | | |
| . | | P | protruding tongue | | |
| , | winking | p | protruding tongue | | |
| | | d | dribble | | |
| Eyes D || \ | sad frown | | |
| x | dead | / | sad frown | | |
| X | angry | 0 | open mouth | | |
| L | loser | O | open mouth | | |
| | | @ | screaming WHAT?! | | |
| | | o | open mouth | | |

*Fig-10*

| Character(s)/Attribute |||||
|---|---|---|---|---|
| Eyes A || Mouth A || Nose A ||
| ": | crying | * | kiss | /\ | big nose |
| ': | crying | x | sealed lips | - | |
| ,': | crying | s | confused | o | |
| "; | crying | S | confused | ^ | |
| ;' | crying | | | O | |
| ,; | crying | Mouth B || 0 | |
| "= | crying | (# | happy braces | v | |
| '= | crying | )# | sad braces | + | |
| ,= | crying | ( | happy | = | |
| | | ) | sad | p | |
| Eyes B || [ | happy | @ | |
| : | | ] | sad | < | big nose |
| ; | winking | { | happy | > | big nose |
| = | | } | sad | | |
| 8 | with glasses | < | happy | Nose B ||
| | | > | sad | } | moustache |
| Eyes C || | | ~ | runny nose |
| (: | with goggles | Mouth C || | |
| (; | with goggles | # | braces | | |
| ' | winking | i | straight | | |
| % | | 1 | straight | | |
| + | | l | straight | | |
| $ | money eyes | B | bucktooth | | |
| ? | questioning eyes | b | bucktooth | | |
| # | | d | protruding tongue | | |
| . | | p | dribble | | |
| , | winking | \ | sad frown | | |
| | | / | sad frown | | |
| Eyes D || 0 | open mouth | | |
| x | dead | O | open mouth | | |
| X | angry | @ | screaming WHAT?! | | |
| L | loser | o | open mouth | | |

*Fig-12*

| Character(s)/Attribute | | | | | | |
|---|---|---|---|---|---|---|
| Hair | | Beard | | Hat | | |
| @ | with curly hair | < | with beard | > | hat | |
| & | with curly hair | | | p | cap | |
| ? | | | | 0 | angel | |
| | | | | O | angel | |
| | | | | | | |
| | | | | | | |

| Eyebrows A | | | |
|---|---|---|---|
| ) | | | |
| ⌐ | | | |
| } | | | |
| v | raised eyebrows | | |
| . | raised eyebrow | | |
| ˉ | | | |

| Eyebrows B | | | |
|---|---|---|---|
| ( | | | |
| ⌐ | | | |
| { | | | |

Fig-13

DYNAMIC METHOD FOR EMOTICON TRANSLATION

FIELD

The present disclosure relates to communication systems and more particularly to a communication system for translating emoticons.

BACKGROUND

Text messaging is an increasingly popular form of communication and is often used when communicating between two mobile devices to convey information quickly and succinctly. To that end, messages sent via text message typically include abbreviations rather than entire phrases or sentences. For example, the phrase "laugh out loud" is typically referred by the acronym "LOL." Representing a phrase by an acronym reduces the typing time associated with generating a text message and provides the recipient of the text message with sufficient information to understand what the sender is trying to convey.

While text messages adequately convey information between mobile devices, detecting a sender's emotion is often difficult given that most text messages are short and relatively to the point. In an effort to convey emotion along with a text message, emoticons are often inserted into a text message to convey an emotion. For example, a colon ":" followed by a ")" signifies to the recipient that the sender is happy, as the combination of a colon with a close parenthesis generates what appears to be a horizontal face when displayed in conjunction with a text message. Such emoticons provide text messages with emotion and allow a user to convey how they are feeling and in what light a text message should be read. For example, a text message stating "I will c U later" if used in conjunction with a colon and a close parenthesis, ":)" signifies that the sender is looking forward to or is happy about seeing the recipient later. Conversely, if the sender includes a colon along with an open parenthesis, ":(" signifies that the sender is unhappy or is otherwise not looking forward to meeting the recipient later. Without including the foregoing emoticons with the phrase "I'll c U later," the recipient has no way of knowing if the sender is happy, sad, or indifferent about the meeting.

Text messages, when sent between a pair of devices having a visual display, adequately convey information between a recipient and sender. However, in situations where it is difficult to view a display of a device, text messaging is often inadequate and therefore does not adequately convey information between a sender and a recipient. Under such circumstances, conventional systems may incorporate an audible device to read a text message, thereby allowing a recipient to perform other tasks without having to visually see the text message. For example, a mobile phone may include a system that audibly communicates a text message to a recipient, thereby allowing the information of the text message to be received by the recipient without requiring the recipient to visually read the text message on a display of the mobile phone. While such systems may communicate text messages to a recipient, it is desirable to include the capability of communicating an emoticon.

SUMMARY

A vehicle communication system is provided and may include at least one communication device that audibly communicates information within the vehicle. A controller may receive a character string from an external device and may determine if the character string represents an emoticon. The controller may translate the character string into a face description if the character string represents an emoticon and may audibly communicate the face description via the at least one communication device.

A method is provided and may include receiving a character string and determining by a processor whether the character string represents an emoticon. The method may further include performing by the processor a vertical-face algorithm to determine if the character string represents a vertical face and performing by the processor a horizontal-face algorithm to determine if the character string represents a horizontal face. The processor may then translate the character string into a face description based on the outcome of at least one of the vertical-face algorithm and the horizontal-face algorithm. Finally, the face description may be communicated.

In another configuration, a method is provided and may include receiving a character string and determining by a processor whether the character string includes a space. The method may also include removing by the processor the space, splitting by the processor the character string into a first character string and a second character string at the space, and determining by the processor whether either or both of the first character string and the second character string represents an emoticon. The processor may perform a vertical-face algorithm to determine if either or both of the first character string and the second character string represents a vertical face and may perform a horizontal-face algorithm to determine if either or both of the first character string and the second character string represents a horizontal face. The processor may then translate at least one of the first character string and the second character string into a face description based on the outcome of at least one of the vertical-face algorithm and the horizontal-face algorithm. The face description may then be communicated.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

BRIEF DESCRIPTION OF THE DRAWINGS

FIG. 8 is a table identifying single-definition emoticons for use by the communication system of FIG. 1;

FIG. 9 is a table identifying emoticon vertical-face characters for use by the communication system of FIG. 1;

FIG. 10 is a table identifying emoticon horizontal left-to-right primary face attribute characters for use by the communication system of FIG. 1;

FIG. 11 is a table identifying emoticon horizontal left-to-right secondary face attribute characters for use by the communication system of FIG. 1;

FIG. 12 is a table identifying emoticon horizontal right-to-left primary face attribute characters for use by the communication system of FIG. 1; and FIG. 13 is a table identifying emoticon horizontal right-to-left secondary face attribute characters for use by the communication system of FIG. 1.

DETAILED DESCRIPTION

Figure 1:
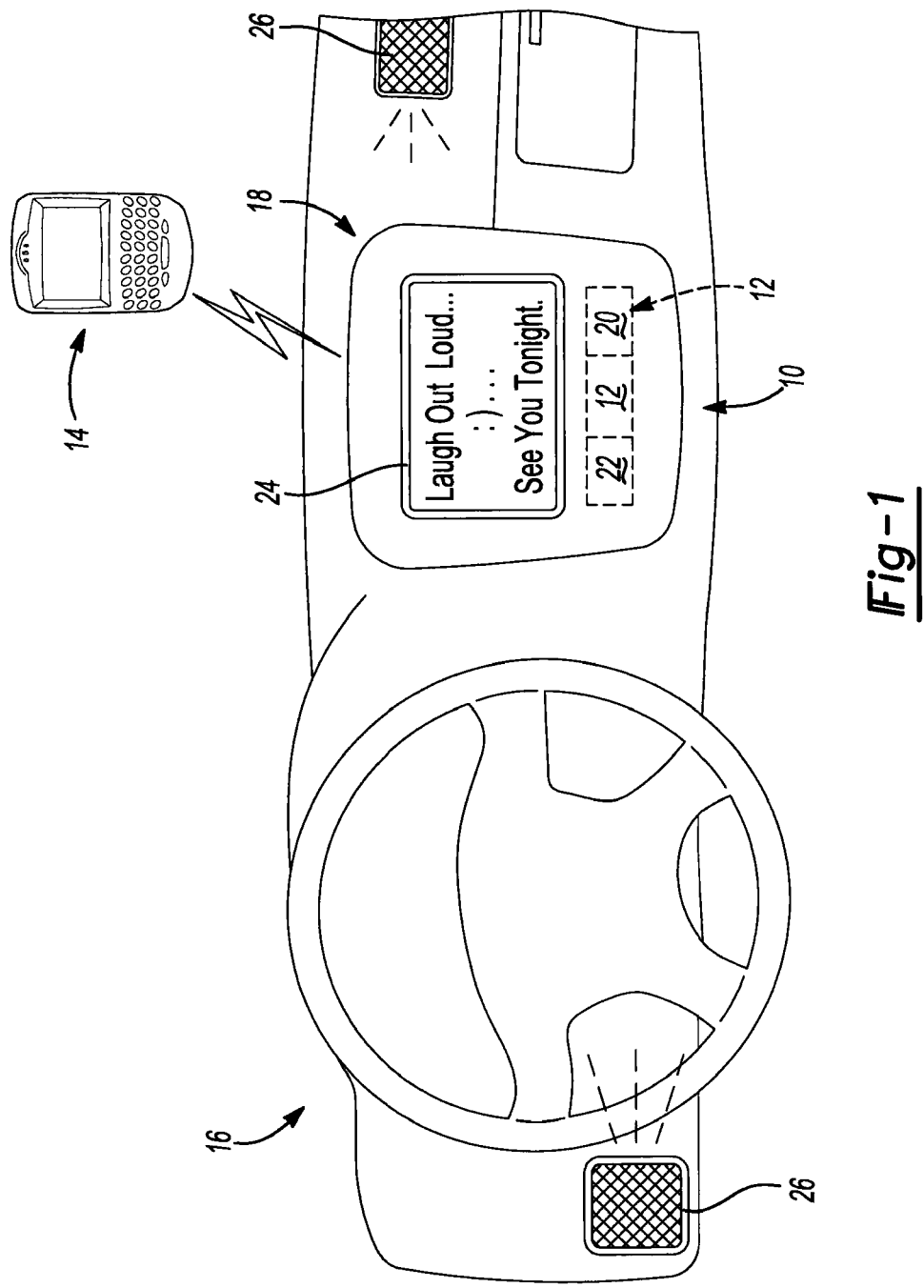
FIG. 1 is a schematic representation of a vehicle incorporating a communication system in accordance with the principles of the present disclosure.

With particular reference to FIG. 1, a communication system 10 is provided and may include a controller 12 in communication with a mobile device 14. In an exemplary embodiment, the mobile device 14 can be a mobile phone as depicted in FIG. 1. In other exemplary embodiments, the device 14 can be another remote communication device type not joined with the vehicle structure such as a remote computer, laptop etc. The controller 12 may receive information from the mobile device 14 such as a character string that represents a text message. The controller 12 may perform a series of algorithms (FIGS. 2A-7C) to translate the character string into a visual and/or audio message in an effort to communicate the text message to a recipient. The controller 12 may perform the various algorithms (FIGS. 2A-7C) to ensure that any emoticons contained in the character string are likewise visually and/or audibly communicated to the recipient.

In one configuration, the communication system 10 may be incorporated into a vehicle 16. The communication system 10 may be a stand-alone system or, alternatively, may be incorporated into or associated with an entertainment system 18 of the vehicle 16. For example, the communication system 10 may be a component of the entertainment system 18 and may be in communication with a display 24 and/or speakers 26 of the entertainment system 18. The communication system 10 may communicate a translated text message via at least one of the display 24 and the speakers 26 to allow a recipient to visually and/or audibly receive a text message received from the mobile device 14. While the algorithms set forth in FIGS. 2A-7C may be used to translate an emoticon associated with a text message between any electronic devices (i.e., between two mobile devices or between a mobile device and a computer), the algorithms set forth in FIGS. 2A-7C will be described and shown hereinafter in the context of a vehicle 16.

Regardless of whether the communication system 10 is a stand-alone system or is incorporated into the entertainment system 18 of the vehicle 16, the controller 12 of the communication system 10 may include a processor 20 and memory 22. The processor 20 and memory 22 could be a shared processor and shared memory of a controller (not shown) associated with the entertainment system 18 or, alternatively, may be a shared processor and a shared memory with a vehicle controller (not shown). The controller may be configured as or may include an Application Specific Integrated Circuit (ASIC), an electronic circuit, a processor (shared, dedicated or group) and memory that executes one or more software or firmware programs, a combinational logical circuit, and/or suitable components that provide the described functionality. Regardless of the particular configuration of the controller 12, the algorithms set forth in FIGS. 2A-7C may be stored in the memory 22 of the controller 12 and may be executed by the processor 20.

As will be described in greater detail below, the algorithms of FIGS. 2A-7C may be executed by the processor 20 to allow the communication system 10 to visually and/or audibly communicate a text message received from the mobile device 14 including any emoticons contained within the text message. Specifically, the communication system 10 may translate the text message into readable text and may visually and/or audibly communicate the text once translated. Translating the text may include displaying and/or audibly communicating a phrase identified in the text message received from the mobile device 14 by way of an acronym such that the entire phrase is visually and/or audibly communicated. For example, a text message received from the mobile device 14 may include an acronym such as "LOL." The communication system 10 may translate the acronym "LOL" into the phrase "laugh out loud" and will visually and/or audibly display the phrase "laugh out loud."

Likewise, the communication system 10 may perform the various algorithms set forth in FIGS. 2A-7C to translate an emoticon contained within the text message received from the mobile device 14. For example, the communication system 10 via the controller 12 may translate an emoticon based on the algorithms set forth in FIGS. 2A-7C to visually and/or audibly recite a face description based on a character string contained within the text message. For example, the communication system 10 may visually and/or audibly communicate the face description "smiling face" if the text message received from the mobile device 14 contains the following character string: space ":)" to allow the recipient to visually and/or audibly receive the emoticon and understand the emotion of the sender. The following description and related FIGS. 2A-7C provide algorithms performed by the processor 20 that allow the processor 20 to translate emoticons contained within text messages received from the mobile device 14 on-the-fly with dynamic flexibility and are not limited to static, look-up tables, or static relationships.

Figure 2A:
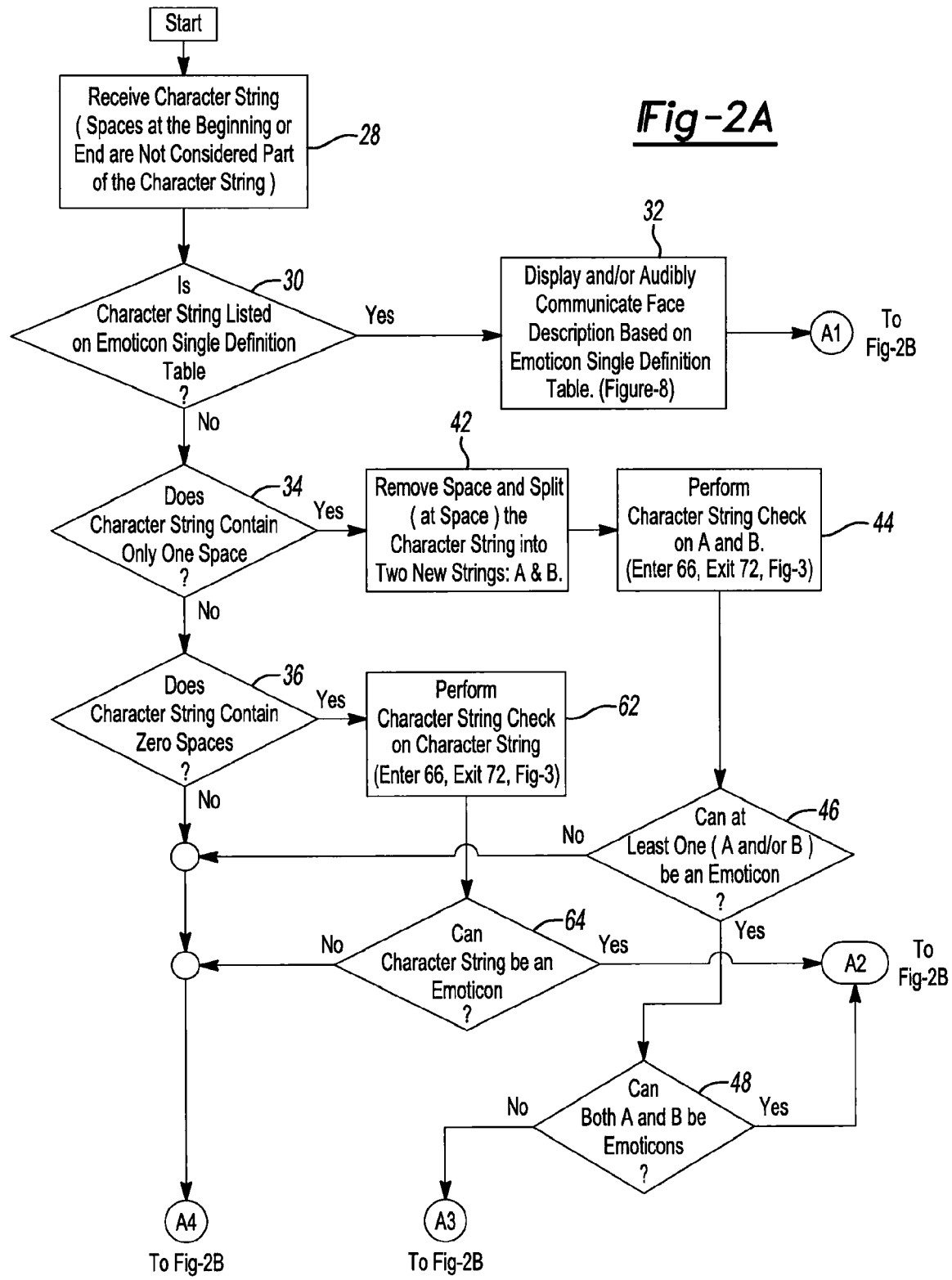
FIGS. 2A-2B provide a flowchart detailing an emoticon algorithm for use by the communication system of FIG. 1.
Figure 2B:
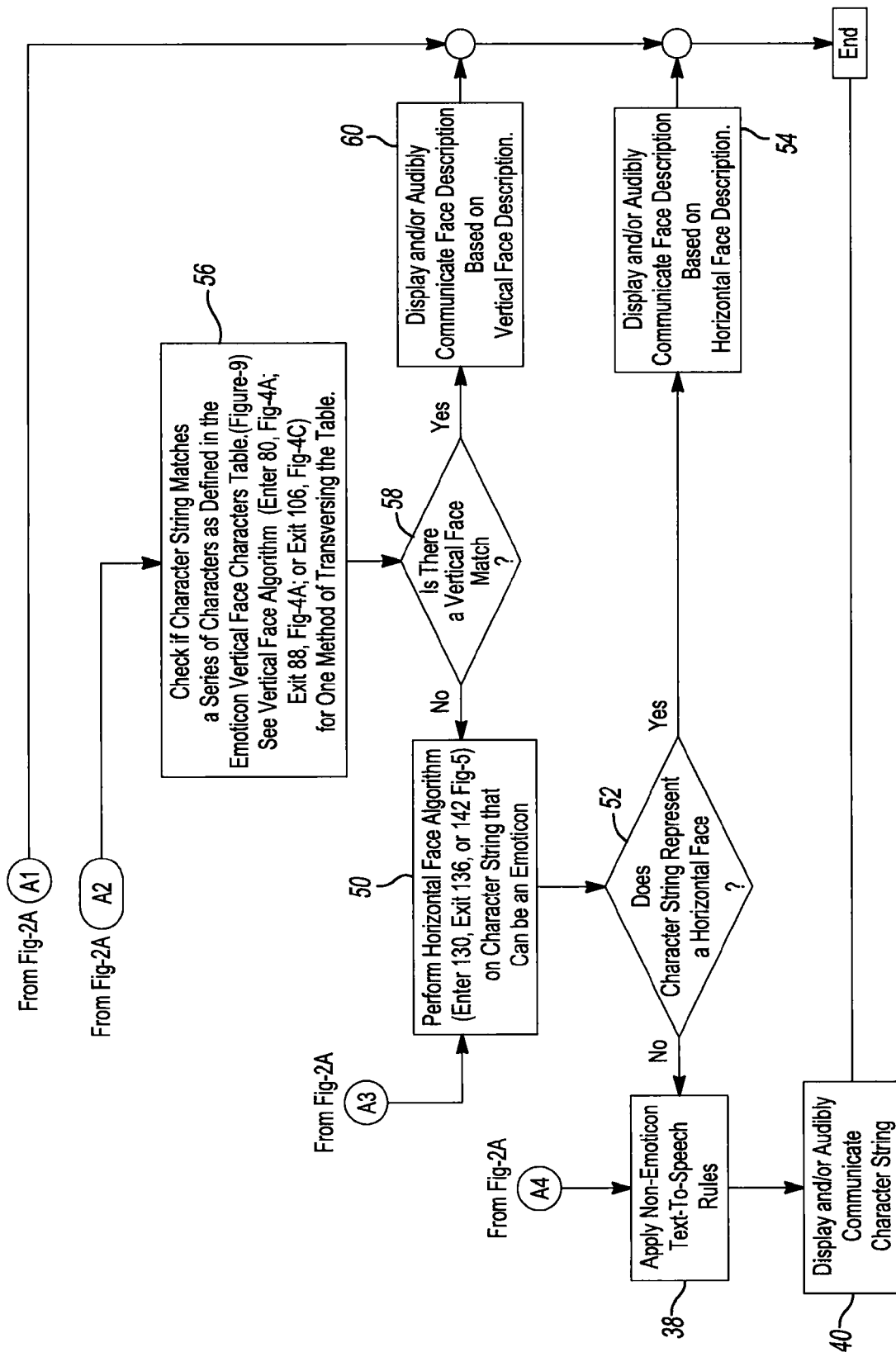

With particular reference to FIGS. 2A-2B, a flowchart is provided detailing an algorithm for use by the controller 12 in determining whether a character string contained within a text message received from the mobile device 14 is an emoticon and, if so, what type of face description the emoticon represents. The controller 12 first receives a character string from the mobile device 14 at 28. The processor 20 determines if the character string is listed on an emoticon, single-definition table shown in FIG. 8 at 30. If the character string received from the mobile device 14 is found within the emoticon, single-definition table of FIG. 8, the controller 12 visually displays and/or audibly communicates the associated face description via the display 24 and/or speakers 26 of the entertainment system 18 at 32. It should be noted that while FIG. 8 provides six exemplary single-definition emoticons, any number of single-definition emoticons could be included in the memory 22.

If the character string received from the mobile device 14 is not listed on the emoticon, single-definition table of FIG. 8, the processor 20 first determines if the character string contains only one space at 34. If the character string does not include only one space, the processor 20 next determines whether the character string contains zero spaces at 36. If the character string does not contain zero spaces, and does not include only a single space, the processor 20 determines that the character string contains more than one space and, as a result, may apply non-emoticon, text-to-speech rules at 38. Test to speech rules include existing protocol and methods for converting text to speech, interpretation, language recognition, etc. The processor 20 may also visually display and/or audibly communicate the character string received from the mobile device 14 via the entertainment system 18 at 40.

If the character string contains one space, as determined at 34, the processor 20 may remove the space and split the character string into a first string (A) and a second string (B) at 42. The processor 20 may then perform a character string check on the first string (A) and may perform a character string check on the second character string (B) at 44 and may determine whether at least one of the first character string (A) and the second character string (B) can be an emoticon at 46. If neither character string (A), (B) can be an emoticon, the processor 20 may apply the non-emoticon, text-to-speech rules at 38 and may visually display and/or audibly communicate the character string at 40 via the entertainment system 18 of the vehicle 16. If, on the other hand, at least one of the character strings (A), (B) can be an emoticon, the processor 20 may then determine if both of the character strings (A), (B) can be emoticons at 48. If both of the character strings (A), (B) cannot be emoticons, the processor 20 may perform a horizontal-face algorithm on the one of the character strings (A), (B) that could be an emoticon based on the algorithms set forth in FIGS. 5-7 at 50.

Figure 5:
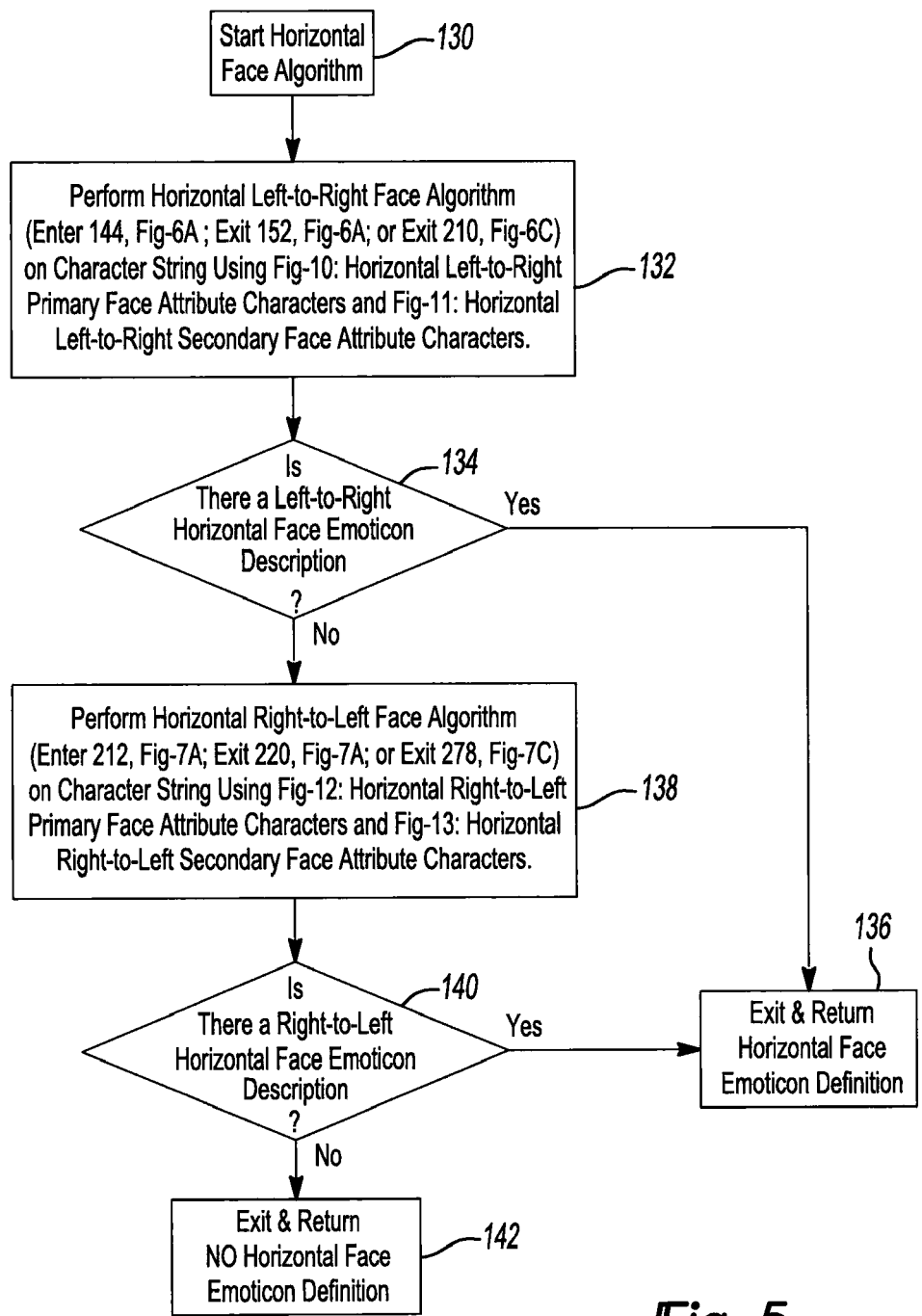
FIG. 5 is a flowchart detailing operation of a horizontal-face algorithm for use by the communication system of FIG. 1.

The processor 20 may perform the algorithms set forth in FIGS. 5-7 and may determine whether the character string represents a horizontal face based on the results of at least one of the algorithms set forth in FIGS. 5-7 at 52. If the character string represents a horizontal face at 52, the controller 12 may visually display and/or audibly communicate the face description via the entertainment system 18 at 54. If the character string does not represent a horizontal face at 52, the processor 20 may apply the non-emoticon, text-to-speech rules at 38 and may then visually display and/or audibly communicate the character string at 40.

If both of the first character string (A) and the second character string (B) can be emoticons at 48, the processor 20 may determine whether the character string matches a series of characters, as defined in the table of FIG. 9 at 56. The processor 20 may utilize the table set forth in FIG. 9 to determine if there is a vertical face match at 58 and, if so, may visually and/or audibly communicate the face description via the entertainment system 18 at 60. If the processor 20 determines that there is not a vertical face match at 58, the processor 20 may perform the horizontal face algorithm at 50 based on the algorithm set forth in FIGS. 5-7. The processor 20 may then determine whether the character string represents a horizontal face at 52 and, if so, may visually display and/or audibly communicate the face description at 54 via the entertainment system 18. If, on the other hand, the character string does not represent a horizontal face at 52, the processor 20 may apply the non-emoticon, text-to-speech rules at 38 and may visually display and/or audibly communicate the character string at 40 via the entertainment system 18.

If the processor 20 determines that the character string does not contain one space at 34 and does identify the character string as containing zero spaces at 36, the processor 20 may perform a character string check on the character string at 62. The character string check performed at 44 and the character string check performed at 62 may be performed by the processor 20 based on the algorithm set forth at FIG. 3, as will be described in greater detail below.

Figure 3:
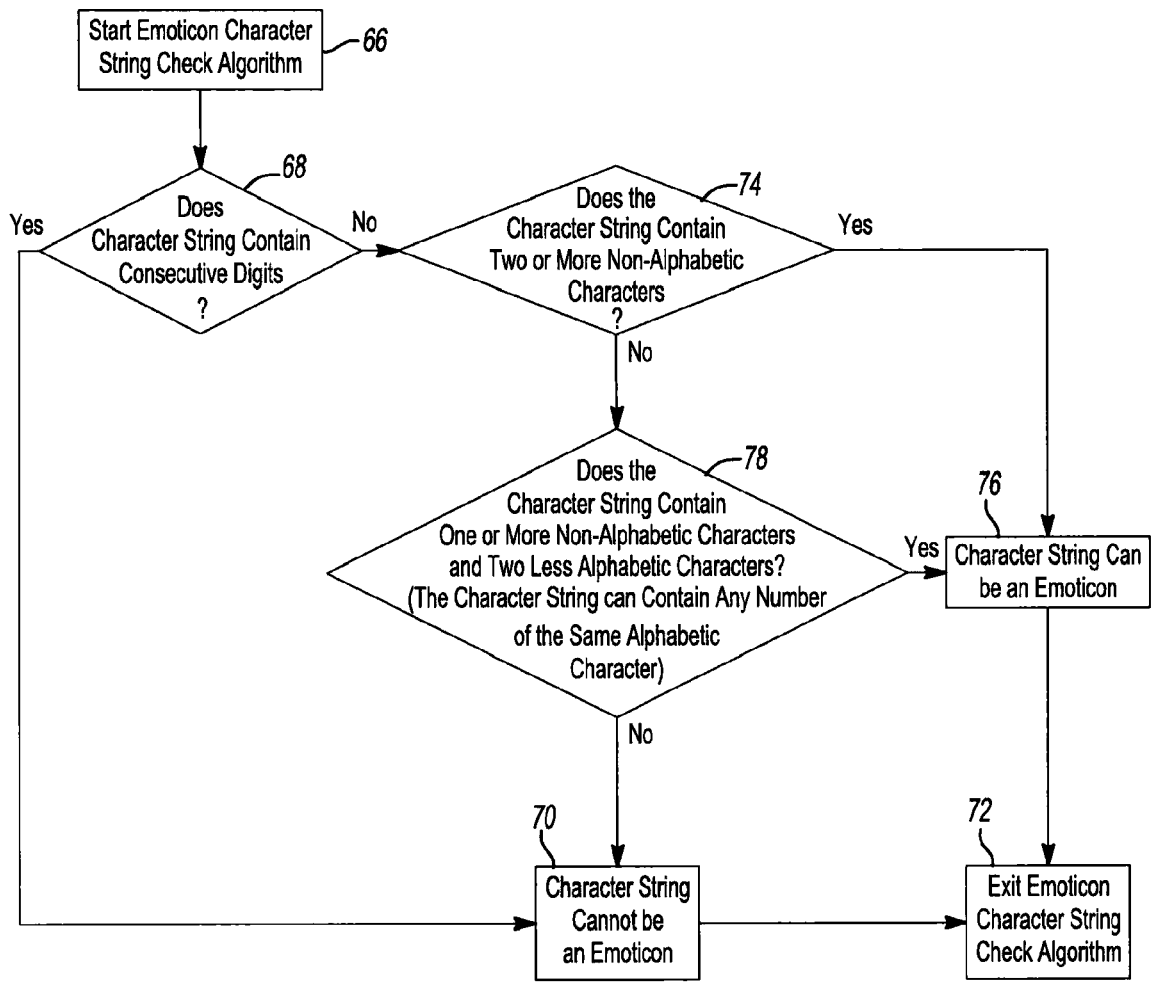
FIG. 3 is a flowchart detailing operation of a character-string-check algorithm for use by the communication system of FIG. 1.

The processor 20, based on the character string check algorithm set forth in FIG. 3, may determine whether the character string can be considered an emoticon at 64. If the processor 20 determines that the character string cannot be an emoticon at 64, the processor 20 applies the non-emoticon, text-to-speech rules at 38 and visually displays and/or audibly communicates the character string at 40 via the entertainment system 18. If the processor 20 determines that the character string can be an emoticon at 64, the processor 20 first checks if the character string matches a series of characters defined by the emoticon, vertical face characters table of FIG. 2B at 56.

The processor 20 then determines if the character string matches a vertical face character based on the table set forth in FIG. 9 at 58 and, if so, visually displays and/or audibly communicates the vertical face description at 60 via the entertainment system 18. If the processor 20 determines that there is not a vertical face match at 58, the processor 20 may perform the horizontal face algorithms set forth in FIGS. 5-7 at 50 and may determine whether the character string represents a horizontal face at 52. If the processor 20 determines that the character string represents a horizontal face at 52, the processor 20 may visually display and/or audibly communicate the horizontal face description at 54 via the entertainment system 18. If, on the other hand, the processor 20 determines that the character string does not represent a horizontal face at 52, the processor 20 may apply the non-emoticon, text-to-speech rules at 38 and may visually display and/or audibly communicate the character string at 40 via the entertainment system 18.

As described above with respect to FIGS. 2A-2B, the controller 12 may perform a character string check on the character string received from the mobile device 14. With particular reference to FIG. 3, the processor 20 may start the character string check algorithm at 66 upon receipt of a character string from the mobile device 14. The processor 20 first checks to see if the character string contains consecutive digits at 68 and if so, determines that the character string cannot be an emoticon at 70. If the character string cannot be an emoticon, as determined at 70, the processor 20 exits the character string check algorithm at 72 and proceeds to apply non-emoticon, text-to-speech rules at 38 (FIG. 2B). If the processor 20 determines that the character string does not contain consecutive digits at 68, the processor 20 next determines whether the character string contains two or more non-alphabetic characters at 74. If the character string contains two or more non-alphabetic characters, the processor 20 determines that the character string can be an emoticon at 76 and proceeds to exit the emoticon character string check algorithm at 72.

As shown in FIG. 2B, upon exiting the character string check algorithm at 72, if the character string can be an emoticon, as determined at 76, the processor 20 will proceed to either steps 50 or 56. If the processor 20 determines that the character string does not contain two or more non-alphabetic characters, the processor 20 next determines whether the character string contains one or more non-alphabetic characters and two or less alphabetic characters at 78. If the character string contains one or more non-alphabetic characters and two or less alphabetic characters, the processor 20 determines that the character string can be an emoticon at 76 and exits the emoticon character string check algorithm at 72. Again, if the character string can be an emoticon as determined at 76, the processor 20 then moves to steps 50 or 56 of FIG. 2B to determine whether the emoticon represents a horizontal face or a vertical face. If the processor 20 determines that the character string does not contain one or more non-alphabetic characters and two or less alphabetic characters at 78, the processor 20 determines that the character string cannot be an emoticon at 70 and exits the emoticon character string check algorithm at 72. Upon exiting the emoticon character string check algorithm at 72, the processor 20 moves to step 38 of FIG. 2B and applies the non-emoticon text-to-speech rules.

Figure 4A:
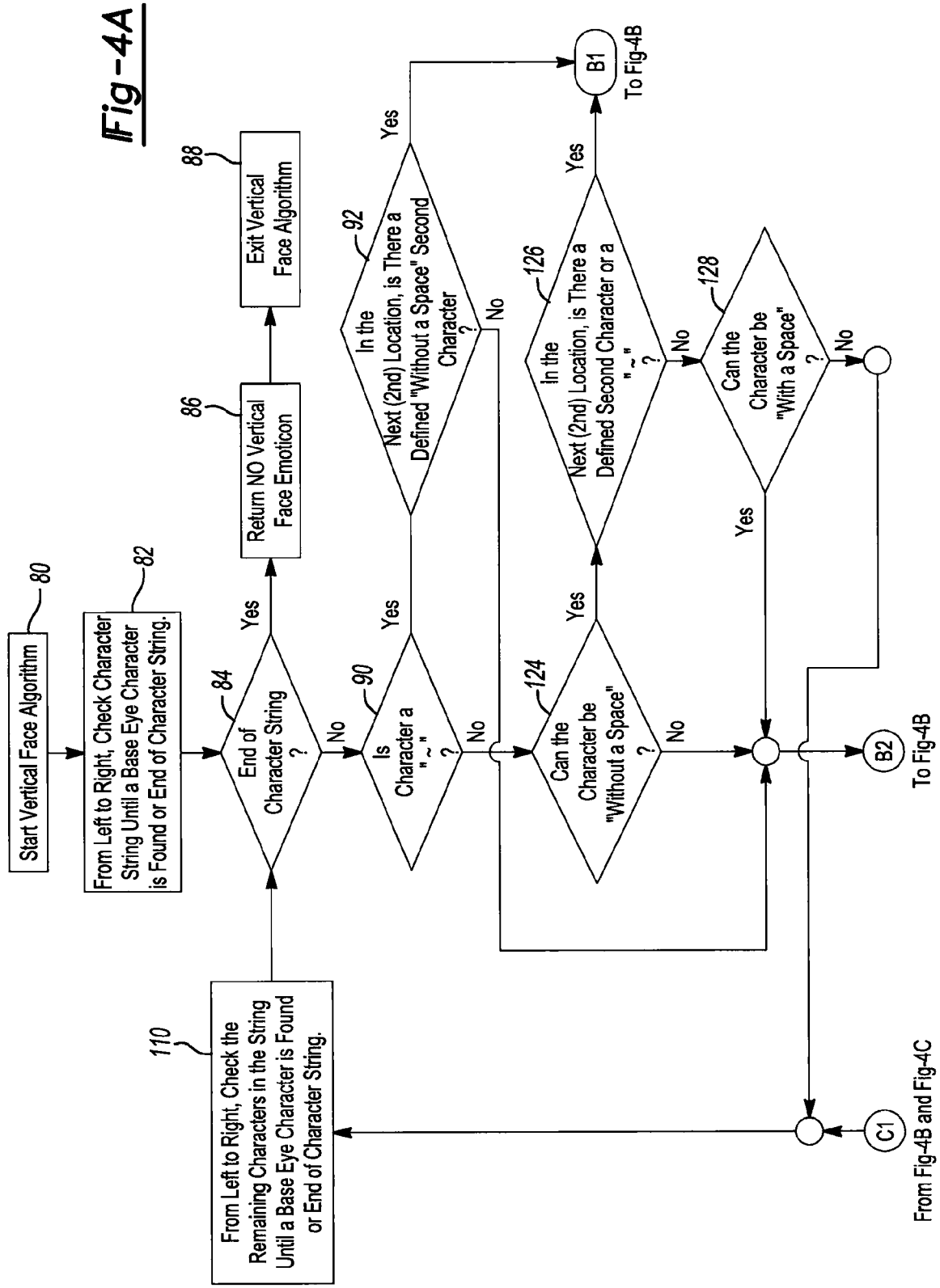
FIGS. 4A-4C provide a flowchart detailing operation of a vertical-face algorithm for use by the communication system of FIG. 1.
Figure 4B:
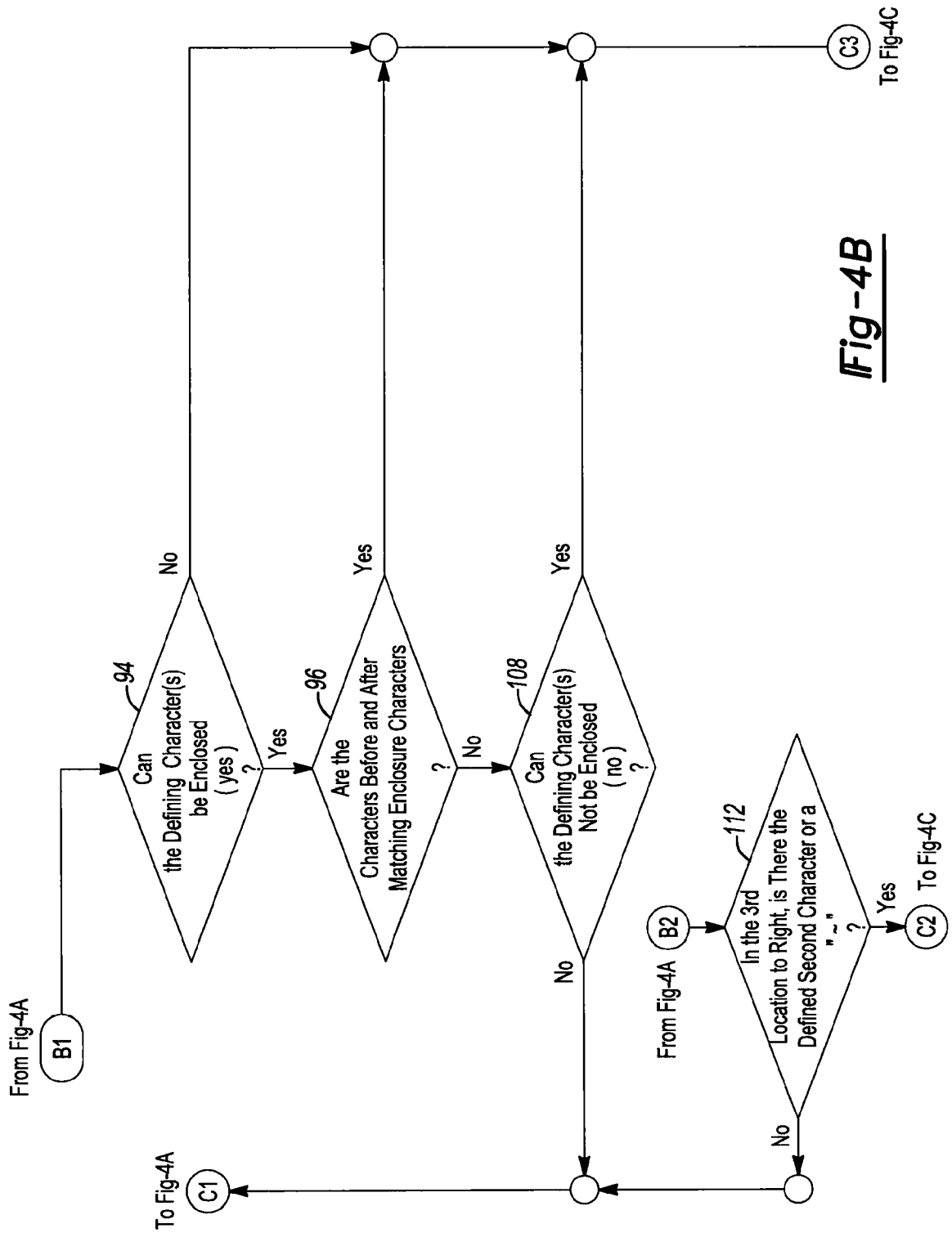
Figure 4C:
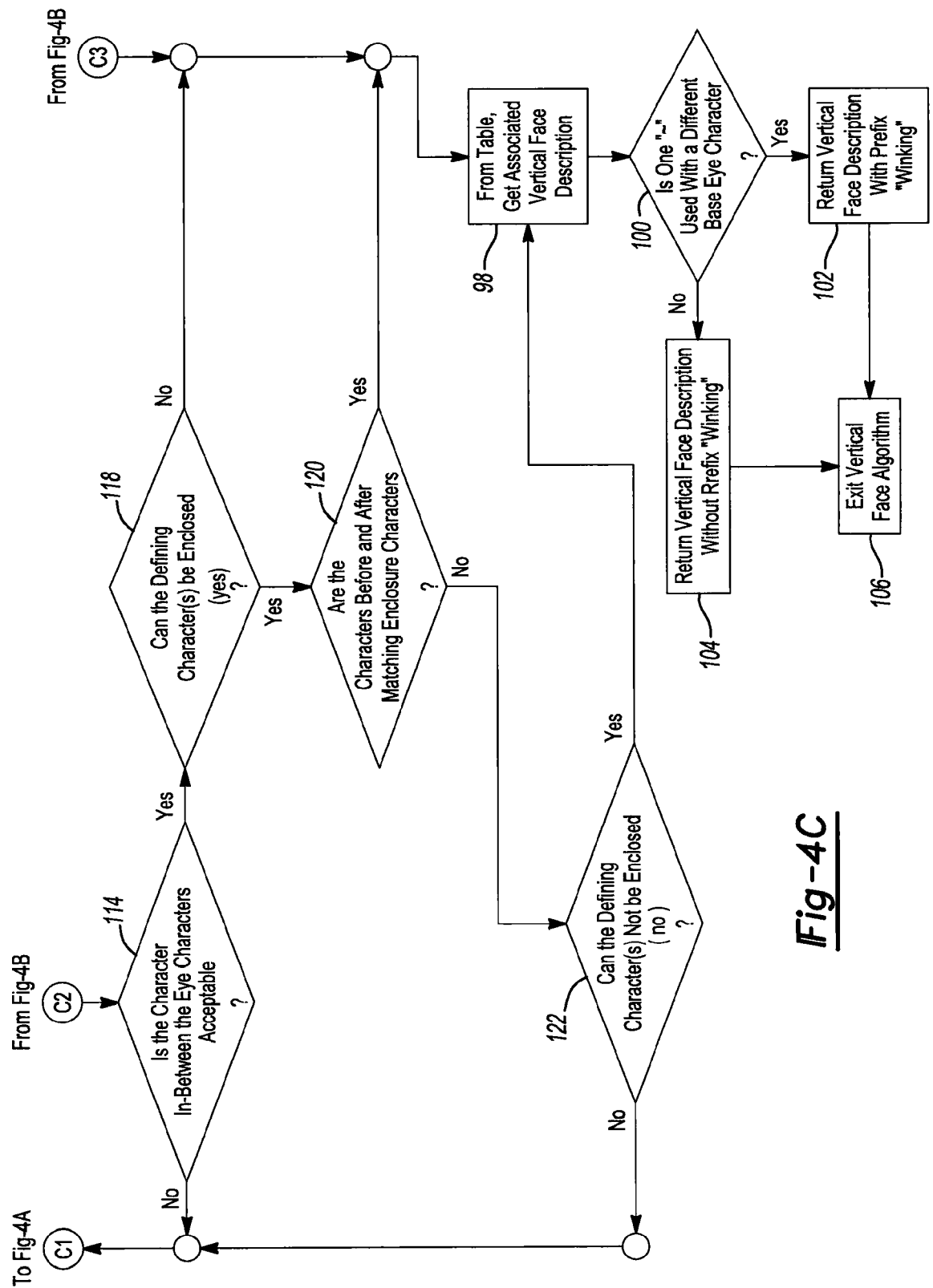

As described above with respect to FIGS. 2A-2B, the processor 20 may apply a vertical-face algorithm at 56 and/or a horizontal-face algorithm at 50 to determine whether a character string received from the mobile device 14 represents a vertical face or a horizontal face. With particular reference to FIGS. 4A-4B, the vertical-face algorithm is provided and may be initiated by the processor 20 at 80. The processor 20 first checks the character string received from the mobile device 14 by checking the characters from left to right until a base eye character is found or the end of the character string is determined at 82. If the end of the character string is determined at 84, the processor 20 determines that the character string does not represent a vertical face emoticon at 86 and exits the vertical face algorithm at 88. Upon exiting the vertical face algorithm at 88, the processor 20 may move to step 50 of FIG. 2B to then determine whether the character string received from the mobile device 14 represents a horizontal face, as will be described in greater detail below.

If the processor 20 determines at 84 that the end of the character string has not been reached prior to identifying a base eye character, the processor 20 next determines whether the base eye character is a "~" at 90. If the processor 20 determines that the base eye character is a "~" at 90, the processor 20 then checks the next character in the character string moving left to right and directly adjacent to the "~" to determine whether there is a defined "without a space" second character at 92. If the processor 20 determines that the second location includes a defined "without a space" second character, the processor 20 determines whether the defining characters may be enclosed at 94. If the processor 20 determines that the characters cannot be enclosed at 94, the processor 20 reads the associated vertical-face description from the table shown in FIG. 9 at 98 and then determines if the "~" is used with a different base eye character at 100. If the processor 20 determines that the "~" is used with a different base eye character at 100, the processor 20 returns the vertical-face description with the prefix "winking" at 102. If the processor 20 determines that the "~" is not used with a different base eye character at 100, the processor 20 returns the vertical-face description without the prefix "winking" at 104. Once the processor 20 returns the vertical-face description either with the prefix "winking" at 102 or without the prefix "winking" at 104, the processor 20 exits the vertical face algorithm at 106.

If the processor 20 determines that the characters may be enclosed at 94, the processor 20 then determines whether there are characters before and after matching enclosure characters at 96. If so, the processor 20 then moves to steps 98-106, as described above.

If the processor 20 determines at 96 that there are not matching enclosure characters, then the processor 20 determines whether the defining characters may not be enclosed at 108. If the defining characters may not be enclosed, as determined by the processor 20 at 108, the processor 20 then moves to steps 98-106, as described above. If the processor 20 determines that the defining characters must be enclosed at 108, the processor 20 again checks the character string from left to right to determine a base eye character or the end of the character string at 110.

If the processor 20 determines at step 92 that the second character adjacent to the "~" character identified at step 90 is not a defined "without a space" second character, the processor 20 then determines whether the third character (i.e., moving left to right along the character string from the "~" character) includes a defined second character or a "~" at 112. If not, the processor 20 moves to step 110 to once again determine from left to right whether the character string includes a base eye character or the processor 20 has reached the end of the character string. If the processor 20 determines that the third location includes a defined second character or a "~" at 112, the processor 20 then determines whether the character in between the eye character is acceptable at 114. If not, the processor 20 moves to step 110 to once again determine from left to right whether the character string includes a base eye character or the processor 20 has reached the end of the character string. If the processor 20 determines that the character between the eye character is acceptable at 114, the processor 20 then determines whether the defining characters can be enclosed at 118 and, if not, the processor 20 then moves to step 98 and performs steps 98-106, as described above.

If the defining characters can be enclosed, as determined at step 118, the processor 20 then determines whether the characters before and after are matching enclosure characters at 120. If the characters are matching enclosure characters, as determined at step 120, the processor 20 then proceeds to perform steps 98-106. If the characters before and after are not matching enclosure characters, as determined at step 120, the processor 20 then determines whether the defined characters may not be enclosed at 122. If the defining characters may not be enclosed, the processor 20 then moves to step 98 and performs steps 98-106. If the defining characters must be enclosed, as determined by step 122, the processor 20 moves to step 110 to once again check the character string from left to right until a base eye character is found or the end of the character string is identified.

Moving back to steps 82, 84, and 90, if the processor 20 determines a base eye character at 82 and does not determine the end of the character string at 84, and, further, that the base eye character is not a "~" at 90, the processor 20 then determines whether the character can be "without a space" based on the table shown in FIG. 9 at 124. If not, the processor 20 moves to step 112 and proceeds as described above. If the processor 20 determines that the base eye character can be a character "without a space" at 124, the processor 20 then determines whether the defined second character (i.e., the character adjacent to the base eye character moving left to right across the character string) includes a defined second character or a "~" at 126. It should be noted that when the processor 20 determines whether the base eye character can be "without a space" at step 124, the processor 20 determines whether the base eye characters may be spaced apart and separated by an adjacent character to define a pair of eye characters with the adjacent character being a "separated by" character, as set forth in the table shown in FIG. 9. Base eye characters with a "separated by" character indicate a particular face. As described above with respect to steps 102 and 104, the "~" can be submitted for any of the base eye characters set forth in the table of FIG. 9 to add the description "winking."

If the processor 20 determines that the location directly to the right and adjacent to the base eye character includes a defined second character or a "~," the processor 20 then proceeds to step 94. If, on the other hand, the processor 20 determines at step 126 that the location directly adjacent to the base eye character does not include a defined second character or a "~," the processor 20 then determines whether the base character can be positioned adjacent to a "separated by" character based on the table shown in FIG. 9 at 128. If the base eye character can be associated with a "separated by" character adjacent to the base eye character, as determined by step 128 in conjunction with the table shown in FIG. 9, the processor 20 then determines whether the third location moving left to right across the character string from the base eye character includes a defined character or a "~" at 112. If the processor 20 determines at step 128 that the base eye character cannot be associated with a space directly adjacent to the base eye character, the processor 20 then moves to step 110 to once again check the character string moving left to right until a base eye character is found or the end of the character string is determined.

As described above, the processor 20 performs the vertical-face algorithm of FIGS. 4A-4B in an effort to determine a vertical-face description with or without a "winking" prefix. If the processor 20 determines a vertical-face description with or without the "winking" prefix, the vertical-face description may be visually displayed and/or audibly communicated at step 60 of FIG. 2B. If, on the other hand, the results of the vertical-face algorithm of FIGS. 4A-4B indicate that the character string received from the mobile device 14 does not represent a vertical-face emoticon at 86, the processor 20 may then perform the horizontal-face algorithm set forth in FIGS. 5-7 at step 50 of FIG. 2B.

With particular reference to FIG. 5, the horizontal-face algorithm may be initiated at 130, whereby the processor 20 first performs a horizontal left-to-right face algorithm on the character string received from the mobile device 14 utilizing the table of FIG. 10 and the table of FIG. 11 at 132. The table of FIG. 10 represents horizontal left-to-right primary face attribute characters while the table of FIG. 11 represents horizontal left-to-right secondary face attribute characters. The processor 20 then determines at 134 whether the character string represents a left-to-right horizontal face emoticon description at 134 and, if so, exits the horizontal-face algorithm and returns the horizontal-face definition at 136. The horizontal-face definition may be visually displayed and/or audibly communicated via the entertainment system 18 at step 54 of FIG. 2B if the processor 20 determines the horizontal-face definition at 136.

If the processor 20 determines that there is not a left-to-right horizontal face emoticon description at 134, the processor 20 may perform a horizontal right-to-left face algorithm on the character string received from the mobile device 14 utilizing the table of FIG. 12 and the table of FIG. 13 at 138. The table of FIG. 12 represents horizontal right-to-left primary face attribute characters while the table of FIG. 13 represents horizontal right-to-left secondary face attribute characters.

The processor 20 then determines whether there is a right-to-left horizontal face emoticon description at 140 and, if so, proceeds to step 136, whereby the processor 20 exits the horizontal-face algorithm and returns the horizontal-face definition for visual and/or audio communication thereof at step 54 of FIG. 2B. If the processor 20 determines that there is not a right-to-left horizontal face emoticon description at 140, the processor 20 exits the horizontal-face algorithm and indicates that the character string received from the mobile device 14 does not represent a horizontal face emoticon at 142. Upon exiting the horizontal-face algorithm and determining that the character string received from the mobile device 14 does not represent a horizontal face emoticon definition, the processor 20 may then move to step 38 of FIG. 2B and may apply non-emoticon, text-to-speech rules.

As indicated in FIGS. 2A-2B, if the controller 20 determines that a character string can be an emoticon and, further that the character string does not represent a vertical face, the controller 20 performs a horizontal-face algorithm at step 50 to determine whether the character string represents a horizontal face. Further, with respect to FIG. 5, the processor 20 first determines whether the character string represents a horizontal left-to-right face by utilizing the algorithm of FIGS. 6A-6C and may subsequently determine whether the character string represents the horizontal right-to-left face based on the algorithm of FIG. 7A-7C.

Figure 6A:
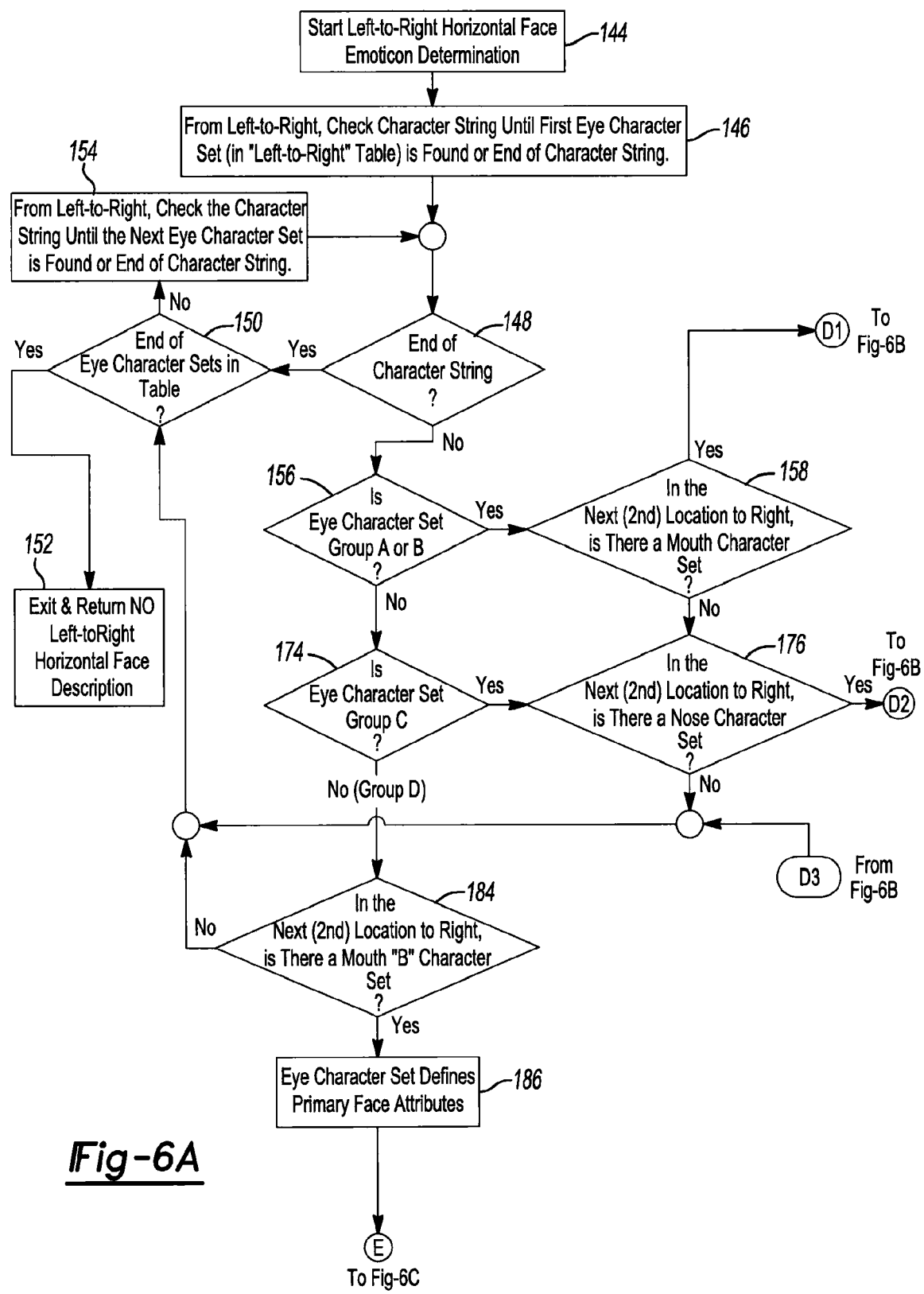
FIG. 6A-6C provide a flowchart detailing operation of a horizontal left-to-right face algorithm for use by the communication system of FIG. 1.
Figure 6B:
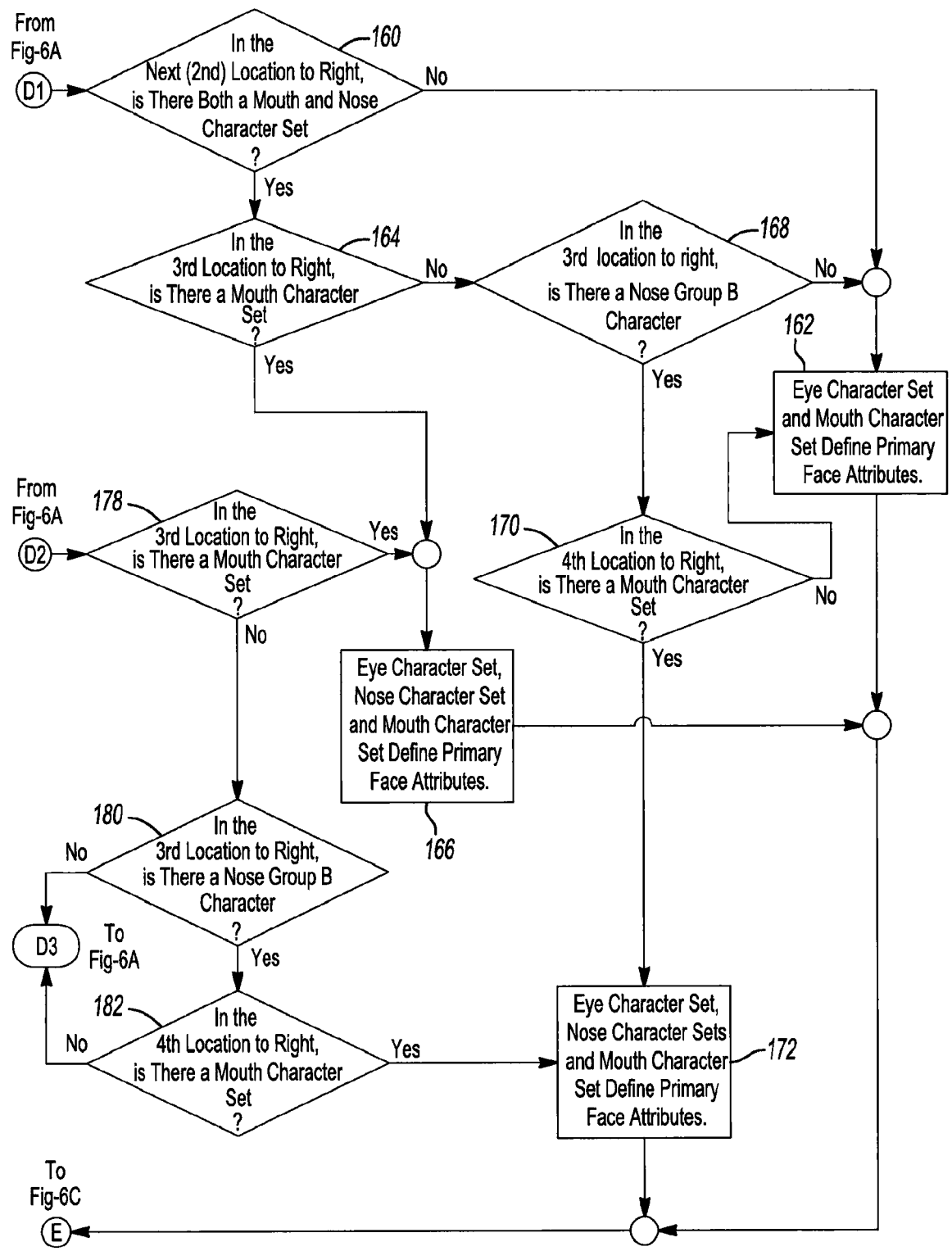
Figure 6C:
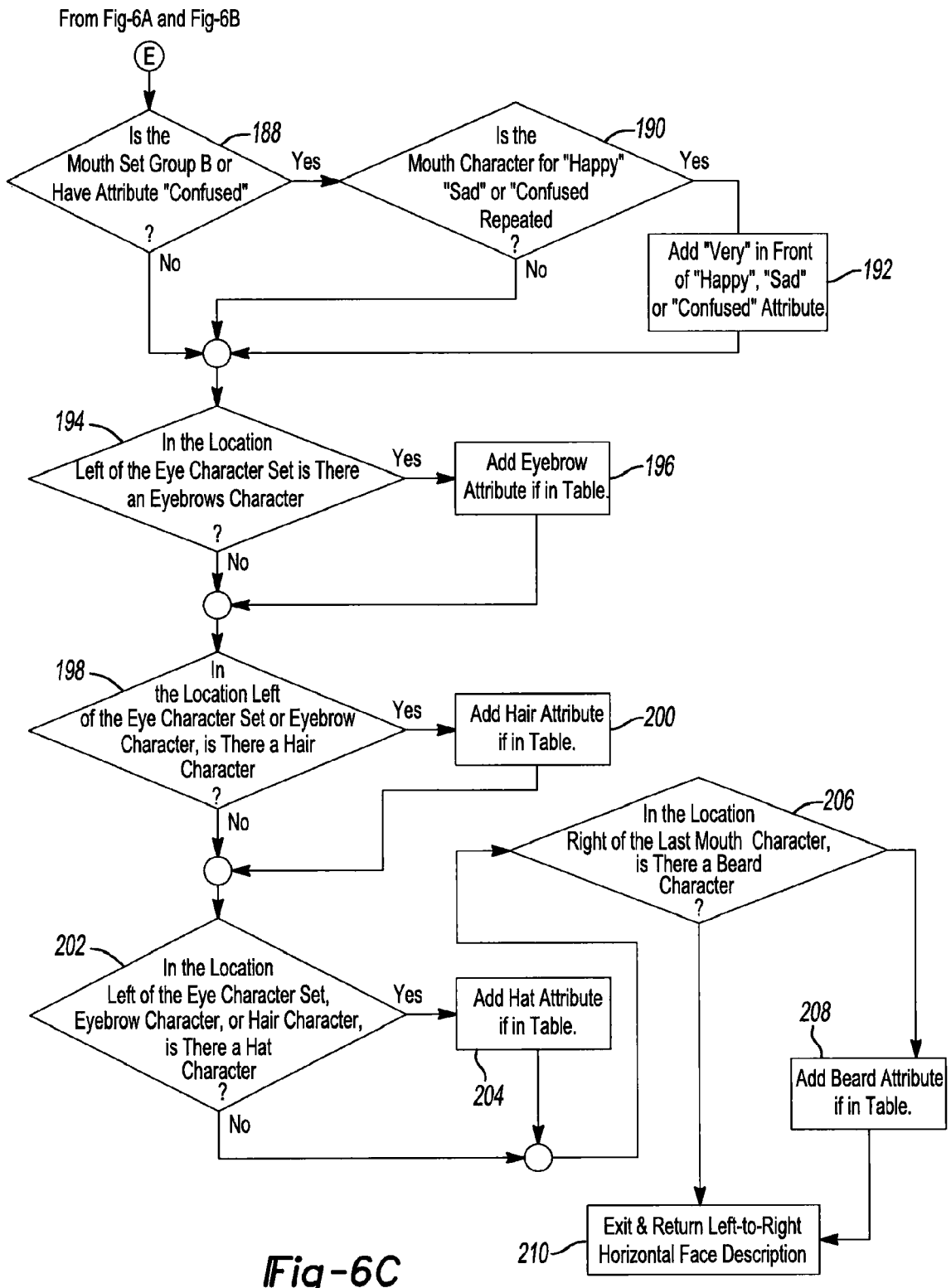

With particular reference to FIGS. 6A-6C, the processor 20 first initiates the left-to-right horizontal face algorithm at 144. The processor 20 then checks the character string received from the mobile device 14 from left-to-right until a first eye character set is found, as set forth in the table of FIG. 10 or the end of the character string is determined at 146. The processor 20 then determines whether the end of the character string has been reached at 148 and, if so, determines whether each eye character set forth in the table of FIG. 10 has been considered at 150 and, if so, exits the horizontal left-to-right face algorithm, indicating that the character string does not represent a left-to-right horizontal face at 152. If the processor 20 determines that each character set forth in the table of FIG. 10 has not been considered at 150, the processor 20 proceeds to continue to check the character string from left-to-right until the next eye character set is found or the end of the character string is determined at 154.

If the end of the character string is not determined at 148, the processor 20 then determines whether the eye character is an eye character from group (A) or from group (B) at 156. If the eye character is from either group (A) or group (B), the processor 20 then determines whether the next location to the right of the eye character (i.e., the location directly adjacent to the right of the eye character) includes a mouth character set at 158. If the next location includes a mouth character set at 158, the processor 20 then determines whether the next location to the right includes both a mouth character and a nose character at 160. If the next location to the right does not include both a mouth character and a nose character at 160, the processor 20 then identifies the eye character set and mouth character set as defining the primary face attributes at 162. If, however, the processor 20 determines that the location directly to the right of the eye character set includes both a mouth and a nose character set at 160, the processor 20 then determines whether the third location to the right of the eye character set includes a mouth character set at 164.

If the third location includes a mouth character set, the processor 20 then determines that the eye character set, the nose character set, and the mouth character set define the primary face attributes at 166. If, however, the third location to the right of the eye character set does not include a mouth character, as determined at step 164, the processor 20 then determines whether the third location to the right of the eye character set includes a nose group (B) character as defined in FIG. 10 at 168. If the third location does not include a nose group (B) character at 168, the processor 20 determines the primary face attributes based on the eye character set and the mouth character set at 162. If, however, the third location to the right of the eye character set includes a nose group (B) character, the processor 20 then determines whether the fourth location to the right of the eye character set includes a mouth character set at 170. If the fourth location to the right of the eye character set includes a mouth character set, as determined at 170, the processor 20 then determines that the primary face attributes are defined by the eye character set, the nose character sets, and the mouth character set at 172. If, however, the processor 20 determines the fourth location to the right of the eye character set does not include a mouth character set, as determined at 170, the processor 20 then identifies the eye character set and mouth character set as defining the primary face attributes at 162.

If the eye character is an eye character from group (A) or from group (B) at 156, and the next location to the right of the eye character does not include a mouth character set at 158, the processor 20 determines whether the next location to the right of the eye character set includes a nose character set at 176. If the next location directly adjacent to the right of the eye character set does not include a nose character set at 176, the processor 20 determines whether each of the eye character sets of the table shown in FIG. 10 have been considered at 150. If the next location directly adjacent to the right of the eye character set is determined to include a nose character set at 176, the processor 20 then determines whether the third location to the right of the eye character set includes a mouth character set at 178. If so, the eye character set, nose character set, and mouth character set define the primary face attributes, as set forth in step 166. If, however, the third location to the right of the eye character set does not include a mouth character set, the processor 20 then determines whether the third location to the right includes a nose group (B) character, as set forth in FIG. 10 at 180. If the processor 20 determines that the third location to the right of the eye character set does not include a nose character from group (B) at 180, the processor 20 then determines whether each eye character from the sets set forth in FIG. 10 have been considered at 150.

If the third location to the right of the eye character set includes a nose character from group (B) at 180, the processor 20 then determines if the fourth location to the right of the eye character set includes a mouth character set at 182. If the fourth location to the right of the eye character set does not include a mouth character set at 182, the processor 20 returns to step 150 to determine if each of the eye character sets of FIG. 10 have been considered. If the fourth location to the right of the eye character set includes a mouth character set, as determined at step 182, the processor 20 then determines the primary face attributes of the character string based on the eye character set, the nose character sets, and the mouth character set at 172.

If the eye character set is not an eye character set of either group (A) or group (B), as determined at 156, the processor 20 then determines whether the eye character set is from group (C) at 174 based on the groups set forth in FIG. 10. If the processor 20 determines that the eye character set is from group (C) at 174, the processor 20 moves to step 172 and proceeds as described above.

If the processor 20 determines that the eye character set is not an eye character set of group (C) at 174 (the eye character set is group (D)), the processor 20 then determines the next location to the right to determine if there is a mouth (B) character set at 184. If the next location to the right does not include a mouth (B) character set at 184, the processor 20 determines whether each of the eye character sets of the table shown in FIG. 10 have been considered at 150. If the next location to the right includes a mouth (B) character set, as determined at step 184, the processor 20 then determines that the eye character set defines the primary face attributes at 186.

Following step 162, 172 or 186, the processor 20 proceeds to determine whether the mouth character set is from group (B) or has the attribute "confused" at 188. If not, the processor 20 determines in a location to the left of the eye character set whether there is an "eyebrow" character defined in the table of FIG. 11 at 194. If the mouth character set is of group (B) or has the attribute "confused" at 188, the processor 20 then determines if the mouth character for "happy," "sad," or "confused" is repeated at 190. If not, the processor 20 determines in a location to the left of the eye character set whether there is an "eyebrow" character defined in the table of FIG. 11 at 194. If the mouth character for "happy," "sad," or "confused" is repeated at 190, the processor 20 adds the term "very" in front of "happy," "sad," or "confused" at 192. The processor 20 then determines in a location to the left of the eye character set whether there is an "eyebrow" character defined in the table of FIG. 11 at 194.

Following step 188, 190 or 192, if the location to the left of the eye character set does not include an "eyebrow" character at 194, the processor 20 determines whether the location left of the eye character set or eyebrow character includes a "hair" character, as set forth in the table of FIG. 11 at 198. If the location to the left of the eye character set includes an "eyebrow" character at 194, the processor 20 adds the eyebrow attribute if the character is found in the table of FIG. 11 at 196. The processor 20 then determines whether the location left of the eye character set or eyebrow character includes a "hair" character, as set forth in the table of FIG. 11.

Following step 194 or 196, if the location to the left of the eye character set or eyebrow character does not include a "hair" character at 198, the processor 20 then determines whether the location left of the eye character set, eyebrow character, or hair character includes a "hat" character at 202 based on the table shown in FIG. 11. If the location to the left of the eye character set or eyebrow character includes a "hair" character at 198, the processor 20 adds the hair attribute based on the table of FIG. 11 at 200. The processor 20 then determines whether the location left of the eye character set, eyebrow character, or hair character includes a "hat" character at 202 based on the table shown in FIG. 11.

Following step 198 or 200, if the location left of the eye character set, eyebrow character, or hair character does not include a "hat" character, the processor 20 then determines whether the location to the right of the last mouth character includes a "beard" character based on the table of FIG. 11 at 206. If the location left of the eye character set, eyebrow character, or hair character includes a "hat" character based on the table of FIG. 11, the processor 20 adds the hat attribute at 204. The processor 20 then determines whether the location to the right of the last mouth character includes a "beard" character based on the table of FIG. 11 at 206.

Following step 202 or 204, if the location to the right of the last mouth character does not include a "beard" character based on the table shown in FIG. 11, the processor 20 then exits the horizontal left-to-right face algorithm and identifies the horizontal-face description based on the table of FIGS. 10 and 11 at 210. If the location to the right of the last mouth character includes a "beard" character based on the table shown in FIG. 11, the processor 20 then adds a beard attribute at 208. The processor 20 then exits the horizontal left-to-right face algorithm and identifies the horizontal-face description based on the table of FIGS. 10 and 11 at 210.

Figure 7A:
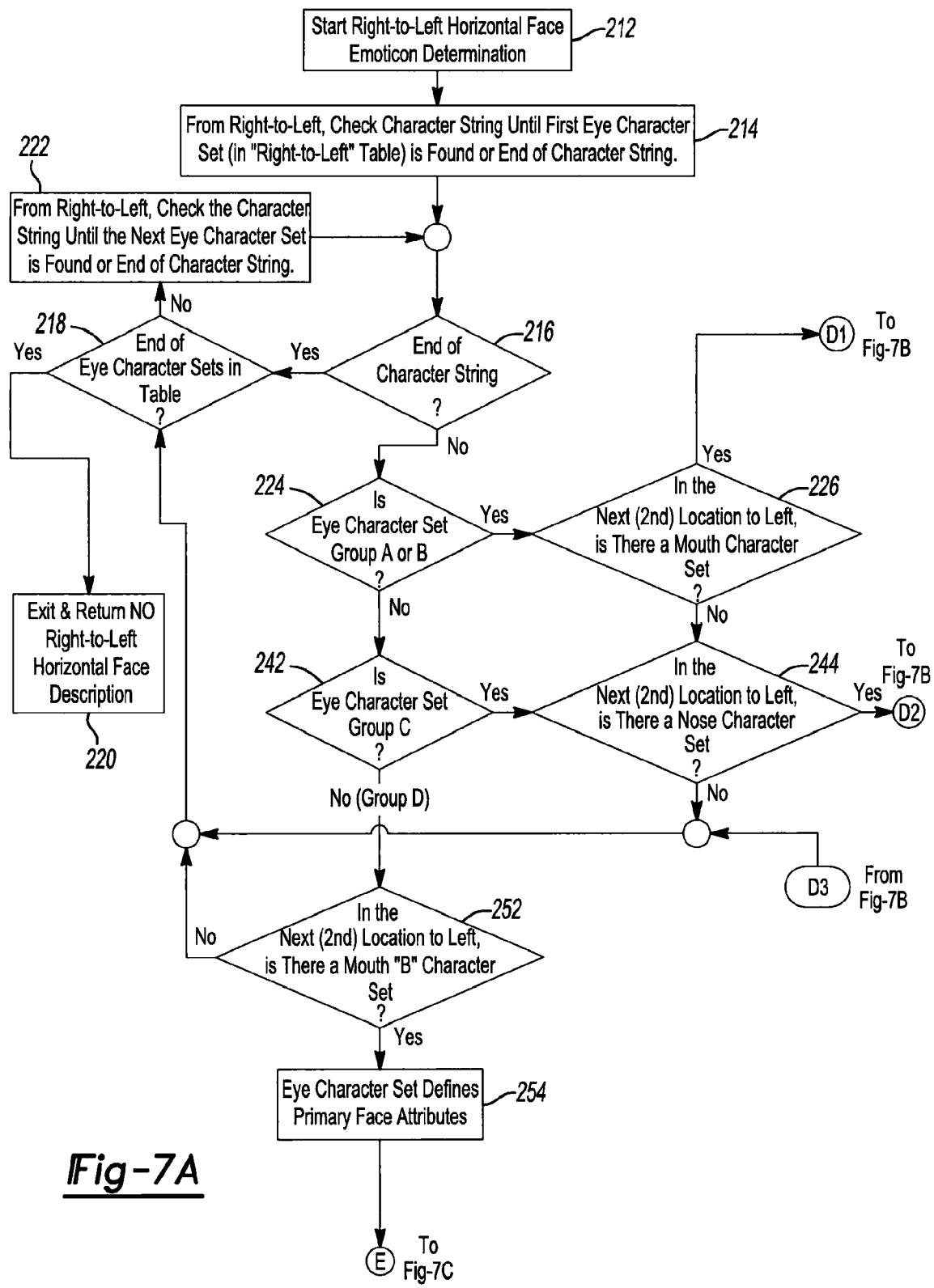
FIG. 7A-7C provide a flowchart detailing operation of a horizontal right-to-left face algorithm for use by the communication system of FIG. 1.
Figure 7B:
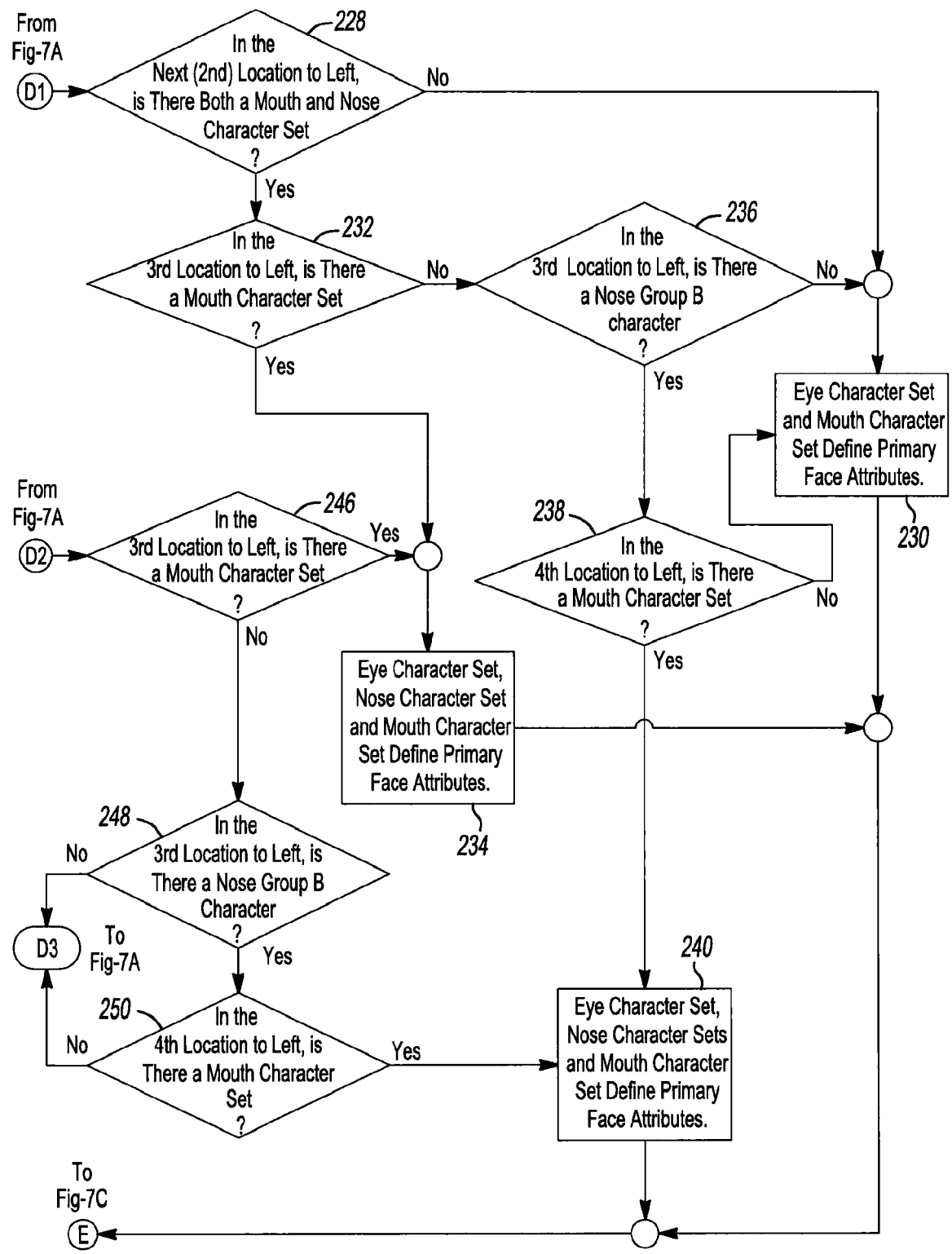
Figure 7C:
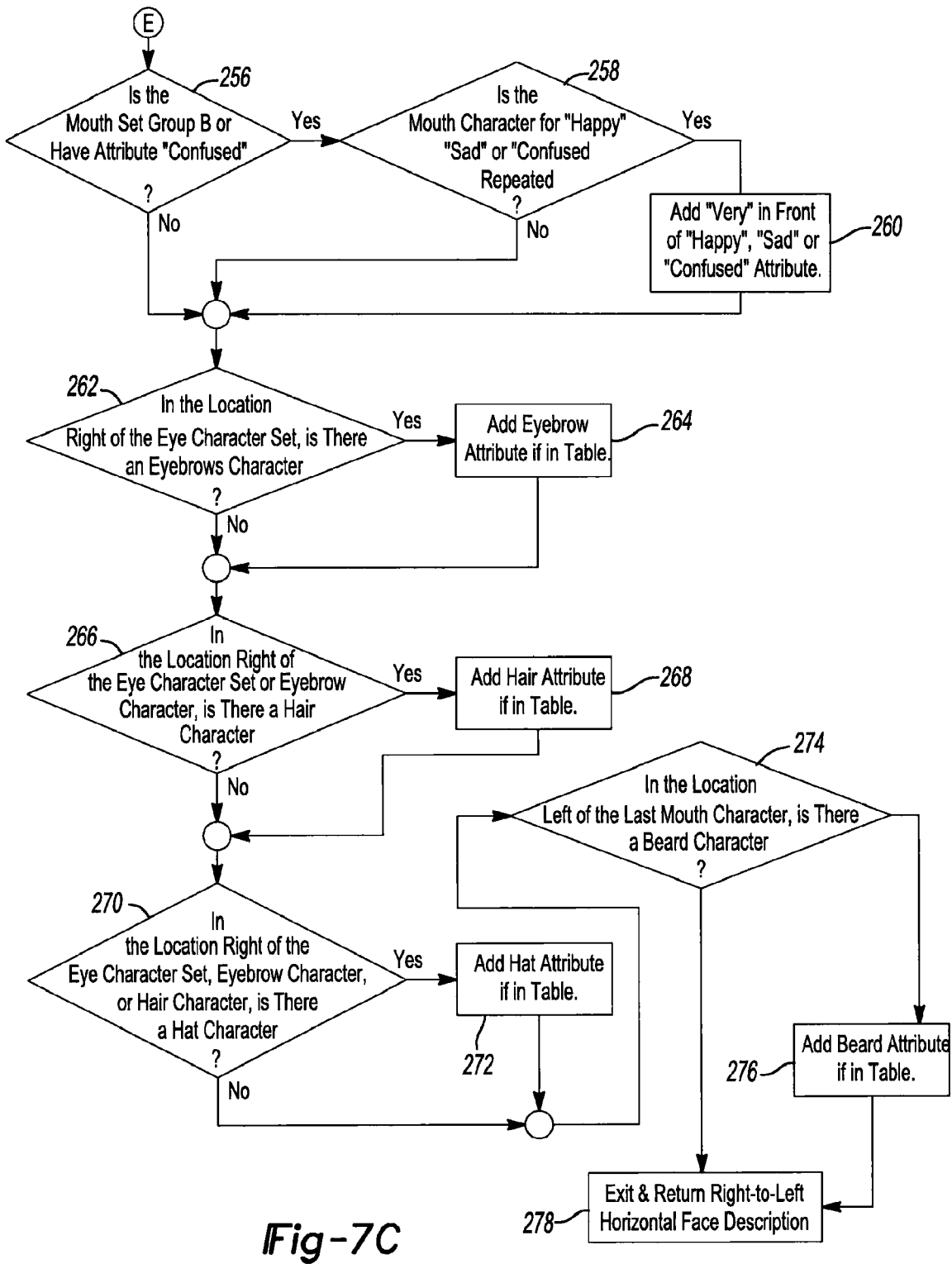

With particular reference to FIGS. 7A-7C, the processor 20 first initiates the right-to-left horizontal face algorithm at 212. The processor 20 then checks the character string received from the mobile device 14 from right-to-left until a first eye character set is found, as set forth in the table of FIG. 12 or the end of the character string is determined at 214. The processor 20 then determines whether the end of the character string has been reached at 216 and, if so, determines whether each eye character set forth in the table of FIG. 12 has been considered at 218 and, if so, exits the horizontal right-to-left face algorithm and indicates that the character string does not represent a right-to-left horizontal face at 220. If the processor 20 determines that each character set forth in the table of FIG. 12 has not been considered at 218, the processor 20 proceeds to continue to check the character string from right-to-left until the next eye character set is found or the end of the character string is determined at 222.

If the end of the character string is not determined at 216, the processor 20 then determines whether the eye character is an eye character from group (A) or from group (B) at 224. If the eye character is from either group (A) or group (B), the processor 20 then determines whether the next location to the left of the eye character (i.e., the location directly adjacent to the left of the eye character) includes a mouth character set at 226. If the next location includes a mouth character set at 226, the processor 20 then determines whether the next location to the left includes both a mouth character and a nose character at 228. If the next location to the left does not include both a mouth character and a nose character at 228, the processor 20 then identifies the eye character set and mouth character set as defining the primary face attributes at 230. If, however, the processor 20 determines that the location directly to the left of the eye character set includes both a mouth and a nose character set at 228, the processor 20 then determines whether the third location to the left of the eye character set includes a mouth character set at 232.

If the third location includes a mouth character set, the processor 20 then determines that the eye character set, the nose character set, and the mouth character set define the primary face attributes at 234. If, however, the third location to the left of the eye character set does not include a mouth character, as determined at step 232, the processor 20 then determines whether the third location to the left of the eye character set includes a nose group (B) character as defined in FIG. 12 at 236. If the third location does not include a nose group (B) character at 236, the processor 20 determines the primary face attributes based on the eye character set and the mouth character set at 230. If, however, the third location to the left of the eye character set includes a nose group (B) character, the processor 20 then determines whether the fourth location to the left of the eye character set includes a mouth character set at 238. If the fourth location to the left of the eye character set includes a mouth character set, as determined at 238, the processor 20 then determines that the primary face attributes are defined by the eye character set, the nose character sets, and the mouth character set at 240. If, however, the processor 20 determines the fourth location to the left of the eye character set does not include a mouth character set, as determined at 238, the processor 20 then identifies the eye character set and mouth character set as defining the primary face attributes at 230.

If the eye character is an eye character from group (A) or from group (B) at 224, and the next location to the left of the eye character does not include a mouth character set at 226, the processor 20 determines whether the next location to the left of the eye character set includes a nose character set at 244. If the next location directly adjacent to the left of the eye character set does not include a nose character set at 244, the processor 20 determines whether each of the eye character sets of the table shown in FIG. 12 have been considered at 218. If the next location directly adjacent to the left of the eye character set is determined to include a nose character set at 244, the processor 20 then determines whether the third location to the left of the eye character set includes a mouth character set at 246. If so, the eye character set, nose character set, and mouth character set define the primary face attributes, as set forth in step 234. If, however, the third location to the left of the eye character set does not include a mouth character set, the processor 20 then determines whether the third location to the left includes a nose group (B) character, as set forth in FIG. 12 at 248. If the processor 20 determines that the third location to the left of the eye character set does not include a nose character from group (B) at 248, the processor 20 then determines whether each eye character from the sets set forth in FIG. 12 have been considered at 218.

If the third location to the left of the eye character set includes a nose character from group (B) at 248, the processor 20 then determines if the fourth location to the left of the eye character set includes a mouth character set at 250. If the fourth location to the left of the eye character set does not include a mouth character set at 250, the processor 20 returns to step 218 to determine if each of the eye character sets of FIG. 12 have been considered. If the fourth location to the left of the eye character set includes a mouth character set, as determined at step 250, the processor 20 then determines the primary face attributes of the character string based on the eye character set, the nose character sets, and the mouth character set at 240.

If the eye character set is not an eye character set of either group (A) or group (B), as determined at 224, the processor 20 then determines whether the eye character set is from group (C) at 242 based on the groups set forth in FIG. 12. If the processor 20 determines that the eye character set is from group (C) at 174, the processor 20 moves to step 244 and proceeds as described above.

If the processor 20 determines that the eye character set is not an eye character set of group (C) at 242 (the eye character set of group (D)), the processor 20 then determines the next location to the left to determine if there is a mouth (B) character set at 252. If the next location to the left does not include a mouth (B) character set at 252, the processor 20 determines whether each of the eye character sets of the table shown in FIG. 12 have been considered at 218. If the next location to the left includes a mouth (B) character set, as determined at step 252, the processor 20 then determines that the eye character set defines the primary face attributes at 254.

Following step 230, 240 or 254, the processor 20 proceeds to determine whether the mouth character set is from group (B) or has the attribute "confused" at 256. If not, the processor 20 determines in a location to the right of the eye character set whether there is an "eyebrow" character defined in the table of FIG. 13 at 262. If the mouth character set is of group (B) or has the attribute "confused" at 256, the processor 20 then determines if the mouth character for "happy," "sad," or "confused" is repeated at 258. If not, the processor 20 determines in a location to the right of the eye character set whether there is an "eyebrow" character defined in the table of FIG. 13 at 262. If the mouth character for "happy," "sad," or "confused" is repeated at 258, the processor 20 adds the term "very" in front of "happy," "sad," or "confused" at 260. The processor 20 then determines in a location to the right of the eye character set whether there is an "eyebrow" character defined in the table of FIG. 13 at 262.

Following step 256, 258, or 260, if the location to the right of the eye character set does not include an "eyebrow" character at 262, the processor 20 determines whether the location right of the eye character set or eyebrow character includes a "hair" character, as set forth in the table of FIG. 13 at 266. If the location to the right of the eye character set includes an "eyebrow" character at 262, the processor 20 adds the eyebrow attribute if the character is found in the table of FIG. 13 at 264. The processor 20 then determines whether the location right of the eye character set or eyebrow character includes a "hair" character, as set forth in the table of FIG. 13.

Following step 262 or 264, if the location to the right of the eye character set or eyebrow character does not include a "hair" character at 266, the processor 20 then determines whether the location right of the eye character set, eyebrow character, or hair character includes a "hat" character at 270 based on the table shown in FIG. 13. If the location to the right of the eye character set or eyebrow character includes a "hair" character at 266, the processor 20 adds the hair attribute based on the table of FIG. 13 at 268. The processor 20 then determines whether the location right of the eye character set, eyebrow character, or hair character includes a "hat" character at 270 based on the table shown in FIG. 13.

Following step 266 or 268, if the location right of the eye character set, eyebrow character, or hair character does not include a "hat" character, the processor 20 then determines whether the location to the left of the last mouth character includes a "beard" character based on the table of FIG. 13 at 274. If the location right of the eye character set, eyebrow character, or hair character includes a "hat" character based on the table of FIG. 13, the processor 20 adds the hat attribute at 272. The processor 20 then determines whether the location to the left of the last mouth character includes a "beard" character based on the table of FIG. 13 at 274.

Following step 270 or 272, if the location to the left of the last mouth character does not include a "beard" character based on the table shown in FIG. 13, the processor 20 then exits the horizontal right-to-left face algorithm and identifies the horizontal-face description based on the table of FIGS. 12 and 13 at 278. If the location to the left of the last mouth character includes a "beard" character based on the table shown in FIG. 13, the processor 20 then adds a beard attribute at 276. The processor 20 then exits the horizontal right-to-left face algorithm and identifies the horizontal-face description based on the table of FIGS. 12 and 13 at 278.

What is claimed is:

1. A vehicle communication system comprising:
at least one communication device operable to audibly communicate information within the vehicle; and
a controller receiving a character string from an external device and operable to determine if said character string represents an emoticon, said controller translating said character string into a face description if said character string represents an emoticon, applying a series of rules to said character string to determine if said emoticon represents a vertical face or a horizontal face, and audibly communicating said face description via said at least one communication device.

2. The vehicle communication system of claim 1, wherein said at least one communication device includes a sound system of the vehicle.

3. The vehicle communication system of claim 1, wherein said controller performs an algorithm on said character string to determine if said character string represents an emoticon.

4. The vehicle communication system of claim 3, wherein said controller determines said character string is an emoticon if said character string contains zero spaces and either two or more non-alphabetic characters or one or more non-alphabetic characters and two or less alphabetic characters.

5. The vehicle communication system of claim 1, wherein said controller references said character string on a database of emoticons to determine said face description and subsequently applies a series of rules to said character string if said character string does not match an emoticon of said database to determine said face description.

6. The vehicle communication system of claim 1, further comprising a user interface, said controller visually displaying at least one of said character string, said emoticon, and said face description via said user interface.

7. The vehicle communication system of claim 1, wherein said controller differentiates between a left-to-right horizontal face and a right-to-left horizontal face.

8. The vehicle communication system of claim 1, wherein said controller determines whether said emoticon represents a left-to-right horizontal face or a right-to-left horizontal face based on the order of the characters in said character string.

9. A method comprising:
receiving a character string;
determining by a processor whether said character string represents an emoticon;
performing by said processor a vertical-face algorithm to determine if said character string represents a vertical face;
performing by said processor a horizontal-face algorithm to determine if said character string represents a horizontal face;
translating by said processor said character string into a face description based on the outcome of at least one of said vertical-face algorithm and said horizontal-face algorithm; and
communicating said face description.

10. The method of claim 9, wherein communicating said face description includes at least one of visually and audibly communicating said face description.

11. The method of claim 10, wherein audibly communicating said face description includes audibly communicating said face description via a sound system of a vehicle.

12. The method of claim 9, wherein determining whether said character string represents an emoticon includes determining whether said character string contains zero spaces and either two or more non-alphabetic characters or one or more non-alphabetic characters and two or less alphabetic characters.

13. The method of claim 9, further comprising referencing by said processor said character string on a database of emoticons to determine said face description prior to performing said vertical-face algorithm and said horizontal-face algorithm.

14. The method of claim 9, further comprising applying by said processor a series of rules to said character string to determine if said emoticon represents a vertical face or a horizontal face.

15. The method of claim 14, further comprising differentiating by said processor between a left-to-right horizontal face and a right-to-left horizontal face.

16. The method of claim 14, further comprising determining by said processor whether said emoticon represents a left-to-right horizontal face or a right-to-left horizontal face based on the order of the characters in said character string.

17. The method of claim 9, further comprising communicating non-emoticon portions of said character string.

18. The method of claim 17, wherein communicating said non-emoticon portions of said character string includes at least one of visually and audibly communicating said non-emoticon portions via a vehicle system.

19. A method comprising:
receiving a character string;
determining by a processor whether said character string includes a space;
removing by said processor said space;
splitting by said processor said character string into a first character string and a second character string at said space;
determining by said processor whether either or both of said first character string and said second character string represents an emoticon;

performing by said processor a vertical-face algorithm to determine if either or both of said first character string and said second character string represents a vertical face;

performing by said processor a horizontal-face algorithm to determine if either or both of said first character string and said second character string represents a horizontal face;

translating by said processor at least one of said first character string and said second character string into a face description based on the outcome of at least one of said vertical-face algorithm and said horizontal-face algorithm; and communicating said face description.

* * * * *